United States Patent
Lucero et al.

(10) Patent No.: US 12,157,700 B2
(45) Date of Patent: Dec. 3, 2024

(54) MODIFIED OXYALKILAMINES AS SHRINKAGE REDUCING AGENTS IN CEMENTITIOUS COMPOSITIONS

(71) Applicant: SIKA TECHNOLOGY AG, Baar (CH)

(72) Inventors: Andrea Lucero, Rutherford, NJ (US); Pedro Gallegos, Coquimbo (CL); Hugo Olivares, Santiago (CL); Carolina Valdebenito, Santiago (CL)

(73) Assignee: SIKA TECHNOLOGY AG, Baar (CH)

( * ) Notice: Subject to any disclaimer, the term of this patent is extended or adjusted under 35 U.S.C. 154(b) by 623 days.

(21) Appl. No.: 17/420,093

(22) PCT Filed: Dec. 23, 2019

(86) PCT No.: PCT/EP2019/086913
§ 371 (c)(1),
(2) Date: Jun. 30, 2021

(87) PCT Pub. No.: WO2020/141129
PCT Pub. Date: Jul. 9, 2020

(65) Prior Publication Data
US 2022/0089492 A1    Mar. 24, 2022

(30) Foreign Application Priority Data

Jan. 3, 2019 (EP) ..................... 19150160

(51) Int. Cl.
*C04B 24/32* (2006.01)
*C04B 28/04* (2006.01)
*C08G 73/02* (2006.01)
*C04B 111/34* (2006.01)

(52) U.S. Cl.
CPC .............. *C04B 24/32* (2013.01); *C04B 28/04* (2013.01); *C08G 73/024* (2013.01); *C04B 2111/346* (2013.01)

(58) Field of Classification Search
None
See application file for complete search history.

(56) References Cited

U.S. PATENT DOCUMENTS

| 4,547,223 A | 10/1985 | Goto et al. |
| 5,032,629 A * | 7/1991 | Hansen ................ C08G 59/184 564/325 |
| 5,475,039 A * | 12/1995 | Butikofer ............. C08G 59/184 523/404 |
| 9,518,147 B2 * | 12/2016 | Padilla-Acevedo ......................... C08G 65/2624 |
| 2016/0152522 A1 | 6/2016 | Würmli et al. |
| 2017/0226012 A1 | 8/2017 | Masanaga |

FOREIGN PATENT DOCUMENTS

| CN | 104812794 A | 7/2015 |
| EP | 1348729 A1 | 10/2003 |
| EP | 1138697 B1 | 11/2003 |
| EP | 1061089 B1 | 3/2004 |
| EP | 2468792 A1 | 6/2012 |
| RU | 2615410 C2 | 4/2017 |
| WO | 2014/043047 A2 | 3/2014 |
| WO | 2015/027192 A2 | 2/2015 |

OTHER PUBLICATIONS

Hampton Research webpage for Jeffamine ED-2001, retrieved from hamptonresearch.com on Apr. 3, 2024. (Year: 2024).*
Polysciences webpage for Dow D.E.R. 736, retrieved from polysciences.com on Apr. 3, 2024. (Year: 2024).*
Feb. 18, 2020 International Search Report issued in International Patent Application No. PCT/EP2019/086913.
Jun. 16, 2021 International Preliminary Report on Patentability issued in International Patent Application No. PCT/EP2019/086913.

* cited by examiner

*Primary Examiner* — Richard A. Huhn
(74) *Attorney, Agent, or Firm* — Oliff PLC

(57) ABSTRACT

An adduct of a polyetheramine and an epoxy-containing compound is used as an agent for reducing drying shrinkage and/or drying cracking in a mineral binder composition.

15 Claims, No Drawings

MODIFIED OXYALKILAMINES AS SHRINKAGE REDUCING AGENTS IN CEMENTITIOUS COMPOSITIONS

TECHNICAL FIELD

The invention relates to the use of an adduct as an agent for reducing drying shrinkage and/or for reducing drying cracking in a mineral binder compositions. Additionally, the invention is concerned with an agent for reducing drying shrinkage and/or for reducing drying cracking, a composition comprising a mineral binder and an agent for reducing drying shrinkage and/or for reducing drying cracking as well as with a method for producing such an agent.

BACKGROUND ART

It has long been known to those skilled in the art that mineral binders, especially cementitious binders, are subject to a contraction in volume during the setting and drying process. This shrinkage is of very great significance for suitability for use, for sustained service life and for strength of the hardened building material, since it is frequently the cause of the formation of cracks, of the dishing of screeds and further faults. In this way, for example, water, dissolved salts and air get through cracks into the interior of the concrete, mortar, screed or slurries and promote corrosion, for example, in reinforced concrete constructions. Moreover, the cyclical stress caused by frost and thaw, with unwanted penetration of water into the building material, leads to mechanical stresses and early material failure.

The construction industry is therefore trying to limit drying shrinkage and/or drying cracking to a minimum through a wide variety of different measures. Attempts have been made to counteract shrinkage not just via the way in which construction is executed and choice of optimized cementitious binder compositions, but in recent times to an increased degree via the addition of organic additives. In the early 1980s, the first shrinkage reducers were developed and successfully used in Japan. Since then, the use of various shrinkage reducers as an admixture has become widespread.

For example, U.S. Pat. No. 4,547,223 (Nihon Cement Ltd., Ltd.) discloses the use of polyoxyalkylenes which are prepared proceeding from an alkanol having 1 to 7 carbon atoms or an OH-functional cycloaliphatic compound having 5 or 6 carbon atoms and contain 1 to 10 monomer units of ethylene oxide and/or propylene oxide.

WO 2015/027192 A2 (Tennessee Technology University et al.) discloses a cement admixture with a low molecular weight alkylamine compound or oxyalkylamine compound for which either autogenous shrinkage or drying shrinking reducing activity is demonstrated. The admixture includes one or more of (A) 2-butylaminoethanol, (B) butylmethylamine, (C) diethylmethylamine, (D) 3-ethoxypropylamine, or (E) 3-propoxypropylamine.

However, many if the drying shrinkage and/or drying cracking reducing agents have one or more disadvantages. For example, some agents are uneconomic because of the high dosage and/or the cost of production thereof, they may disrupt the action of other additives or delay the evolution of strength of the cementitious systems.

There is thus still a need to develop new and improved solutions which reduce or overcome the aforementioned drawbacks.

DISCLOSURE OF THE INVENTION

It is an object of the present invention to provide methods and products which do not have the above mentioned drawbacks. In particular, beneficial methods and products for reducing or preventing drying shrinkage and/or for reducing drying cracking of mineral binder compositions shall be provided. Especially, negative effects on mineral binder properties, in particular on early strength development and/or on workability, caused by the methods and products shall be as low as possible. Moreover, the products shall be obtainable as economic as possible.

Surprisingly, it has been found that the problem of the invention can be solved by the use according to claim 1. Thus, the main aspect of the invention is the use of an adduct of a polyetheramine and an epoxy epoxy-containing compound as an agent for reducing drying shrinkage and/or for reducing drying shrinkage cracking in a mineral binder composition.

As has been shown, adducts of a polyetheramine and an epoxy epoxy-containing compound can be used as highly effective shrinkage-reducing agents and/or cracking-reducing agents in mineral binder compositions, especially at early times of 2 hours to 3 days or 2 hours to 2 days (1 day=24 hours). At comparable dosages, it is possible to achieve a shrinkage reduction which is at least as good as with known shrinkage-reducing agents whereas impairment of strength development, especially at early times of 2 hours to 3 days or 1 to 3 days, of mineral binder compositions can be kept on a rather low level. Moreover, workability of the mineral binder is only slightly affected by the inventive adducts of a polyetheramine and an epoxy epoxy-containing compound.

Thus, when using adducts of a polyetheramine and an epoxy epoxy-containing compound as shrinkage and/or cracking reducing agents, high quality hardened mineral binder compositions, in particular mortars, grouts and/or concretes, with low cracking tendency can be produced. Such kind of high quality hardened compositions can e.g. be used for demanding applications with wind towers.

Also, the adducts of a polyetheramine and an epoxy epoxy-containing compound of the present invention have been shown to be compatible with many conventional dispersants and other concrete additives.

Further aspects of the invention are the subject matter of other independent claims. Especially preferred embodiments of the invention are the subject matter of the dependent claims.

WAYS OF CARRYING OUT THE INVENTION

A first aspect of the invention relates to the use of an adduct of a polyetheramine and an epoxy epoxy-containing compound as an agent for reducing drying shrinkage and/or for reducing drying cracking in a mineral binder composition, especially a mortar, grout or concrete composition.

In the present context, "drying shrinkage" refers to the volume reduction of hardening or hardened mineral binder compositions, especially hardening mortar, grout or concrete, due to the loss of internal water towards the environment, especially during drying or hardening of the mineral binder composition. In particular, drying shrinkage is measured according to standard ASTM C596-09 (2017).

Thus, an agent for reducing drying shrinkage is, for example, a substance which, when added to a mineral binder composition and compared to a control without the agent but otherwise identical mineral binder composition, leads to a reduction of the drying shrinkage of the hardening mineral binder composition.

"Drying cracking" refers to the formation of cracks in hardening or hardened mineral binder compositions, especially in hardening mortar, grout or concrete, during drying or hardening of the mineral binder composition. Especially, as a measure for drying cracking, the age at cracking is taken which is measured according to standard ASTM C 1581-04 596-09.

Thus, an agent for reducing drying cracking is, for example, a substance which, when added to a mineral binder composition and compared to a control without the agent but otherwise identical mineral binder composition, leads to a reduced crack formation or to an extension of the age at cracking of the hardening mineral binder composition.

Especially, the adduct of a polyetheramine and an epoxy epoxy-containing compound is used as an agent for reducing drying shrinkage and/or for reducing the drying cracking in a mineral binder composition in the time interval of 2 hours-28 days, particularly in the time interval of 5 hours to 8 days, especially 4-5 days or 5-48 hours, after mixing of the mineral binder composition.

The term "mineral binder" denotes, for example, a binder which reacts in the presence of water in a hydration reaction to form solid hydrates or hydrate phases. This can be, for example, a hydraulic binder (for example, a cement or a hydraulic lime), a latent hydraulic binder (for example, slag), a puzzolanic binder (for example, fly ash) or a nonhydraulic binder (gypsum or calcium lime). The term "cementitious binder" or "cementitious binder composition" here denotes, for example, a binder or a binder composition having a proportion of at least 5 wt %, for example, at least 20 wt %, for example, at least 35 wt %, for example, at least 65 wt % cement clinker. The cement clinker can be a Portland cement clinker. In the present context, cement clinker can denote a ground cement clinker.

A "mineral binder composition" is a composition comprising a mineral binder and optionally further components, especially, aggregates admixtures and/or water.

For example, the mineral binder or the binder composition contains a hydraulic binder, for example, a cement. A cement having a cement clinker proportion of >35 wt % can be used. For example, the cement is of the CEM I, CEM II, CEM III, CEM IV or CEM V type (according to the standard EN 197-1). A proportion of the hydraulic binder in the entire mineral binder can be at least 5 wt %, for example, at least 20 wt %, for example, at least 35 wt %, for example, at least 65 wt %. According to an exemplary embodiment, the mineral binder consists of at least 95 wt % hydraulic binder, for example, cement clinker.

The binder or the binder composition can contain, or consist of, other binders. They are, for example, latent hydraulic binders and/or puzzolanic binders. Suitable latent hydraulic and/or puzzolanic binders are, for example, slag, fly ash and/or silica dust. Similarly, the binder composition can contain inert substances, such as, for example, limestone, quartz meals and/or pigments. In an exemplary embodiment, the mineral binder contains 5-95 wt %, for example, 5-65 wt %, for example, 15-35 wt % latent hydraulic and/or puzzolanic binders, with respect to the total mineral binder content. Advantageous latent hydraulic and/or puzzolanic binders are slag and/or fly ash.

In an exemplary embodiment, the mineral binder contains a hydraulic binder, in particular a cement or cement clinker, and a latent hydraulic and/or puzzolanic binder, preferably slag and/or fly ash. The proportion of the latent hydraulic and/or puzzolanic binder here can be 5-65 wt %, for example, 15-35 wt %, with at least 35 wt %, for example, at least 65 wt % hydraulic binder, with respect to the total mineral binder content.

Especially, the mineral binder composition is a mortar, grout or concrete composition comprising a mineral binder, aggregates and water. With respect to the solid content at the time of mixing, the mineral binder composition comprises for example 5-25 wt. %, in particular 10-20 wt. %, of mineral binder, especially cement, and 75-95 wt. %, in particular 80-90 wt. %, aggregates, especially sand, gravel and/or rock material.

For example, especially at the time of mixing, a weight ratio of water to mineral binder can be in the range of 0.25-0.8, for example, 0.3-0.6, for example, 0.35-0.5. Such binder compositions can be processed directly as mortar mixtures, grout mixtures or concrete mixtures.

Substance names starting with "poly", such as polyether, typically denote substances that formally contain two or more of the functional groups occurring in their name per molecule.

A "polyetheramine" is a substance comprising a polyether backbone as well as at least one amine group. A polyether in particular is a polymer with at least two monomeric repeating units each containing an ether group.

In particular, the polyetheramine comprises or consists of an amine terminated poly(alkylene oxide), especially an amine terminated poly(propylene oxide).

Preferably, the polyetheramine is a monoamine and/or a diamine, especially a diamine.

Especially, preferred, the amine group(s) in the polyetheramine is/are primary amine group(s).

Advantageously, the polyetheramine comprises or consists of an poly(propylene oxide) diamine, whereby either side of a poly(propylene oxide) backbone is amine terminated, especially with primary amine groups.

A molecular weight ($M_n$) of the polyetheramine preferably is from 100-10'000 g/mol, especially from 150-7'000 g/mol, in particular 200-5'000 g/mol.

In the present context, the molecular weight of adducts or polymers denotes the number average molecular weight $M_n$ which is typically determined by GPC against polystyrene as standard.

In particular, the polyetheramine has a structure according to formula I:

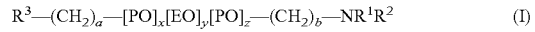

$$R^3-(CH_2)_a-[PO]_x[EO]_y[PO]_z-(CH_2)_b-NR^1R^2 \quad (I)$$

whereby
EO=ethylene oxide,
PO=propylene oxide,
$R^1$=H or an alkyl group with 1-5 carbon atoms, especially H or an isopropyl group, preferably H,
$R^2$=H or an alkyl group with 1-5 carbon atoms, especially H,
$R^3$=alkyl group with 1-5 carbon atoms, a group of formula —$NR^1R^2$ or a group of formula —$CH_2$—$CH(CH_3)$—$NR^1R^2$,
a=0-4, especially 2-3,
b=0-4, especially 2-3,
x=0-100, especially 1-10,
y=0-100, especially 1-10,
z=0-100, especially 1-10.

In a special embodiment, $R^1$=isopropyl and $R^2$=H. In this case, the amine group is present in the form of a secondary amine group.

Especially preferred are polyetheramines according to formula I wherein $R^1$=$R^2$=H, $R^3$=—$NR^1R^2$, a=b=0, x=2-100, especially 2-70 and y=z=0. These are poly(propylene oxide) diamines which are terminated at each end with a primary amine group. Such kind of polyetheramines have been proven to be especially suitable in the present context.

Preferred polyetheramines are products from the amination of polyoxyalkylenediols and/or polyoxyalkylenetriols and are obtainable, for example, under the Jeffamine® name (from Huntsman), under the Polyetheramine name (from BASF) or under the PC Amine® name (from Nitroil).

Especially suitable polyoxyalkylene diamines are Jeffamine® D-230, Jeffamine® D-400, Jeffamine® D-2000, Jeffamine® D-4000, Jeffamine® HK-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramine D 230, Polyetheramine D 400 and Polyetheramine D 2000, PC Amine® DA 250, PC Amine® DA 400, PC Amine® DA 650 and PC Amine® DA 2000.

Especially suitable polyoxyalkylene triamines are obtainable, for example, under the Jeffamine® trade name (from Huntsman), under the Polyetheramine name (from BASF) or under the PC Amine® name (from Nitroil), for example Jeffamine® T 403, Jeffamine® T 3000, Jeffamine® T 5000; Polyetheramine T403, Polyetheramine T5000 and PC Amine® TA 403.

An epoxy-containing compound is a chemical compound comprising at least one epoxide group. Preferably, the epoxy-containing compound is an organic compound.

The epoxy-containing compound preferably comprises or consists of a monoepoxide and/or a diepoxide and/or a triepoxide. This means that the epoxy-containing compound comprises exactly 1, 2 or 3 epoxide groups, respectively.

Preferably, the epoxy-containing compound comprises or consists of a glycidyl ether, especially an alkyl glycidyl ether. The term "glycidyl" stands for a group of formula II:

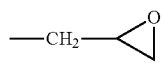

(II)

Preferably, the epoxy-containing substance comprises or consists of a diglycidyl ether and/or a triglycidyl ether, especially a diglycidyl ether of an aliphatic diol and/or a triglycidyl ether of an aliphatic triol.

The epoxy-containing substance preferably has a structure according to formula III:

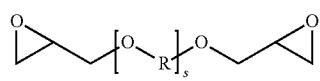

(III)

whereby
R=alkyl group with 1-10 carbon atoms,
s=0 or 1.

A molecular weight of the epoxy-containing compound preferably is from 50-2'000 g/mol, especially from 75-1'000 g/mol, in particular 100-500 g/mol for example 120-300 g/mol.

Especially, in formula III, R=alkyl group with 2-7, in particular 3-6, carbon atoms and s=1.

The epoxy-containing compound may e.g. be selected from:
a glycidyl ether of a saturated or unsaturated, branched or unbranched, cyclic or open-chain C2 to C30 diol, for example ethylene glycol, propylene glycol, butylene glycol, hexanediol, octanediol, a polypropylene glycol, dimethylolcyclohexane, neopentyl glycol or dibromoneopentyl glycol,
a glycidyl ether of a tri- or tetrafunctional, saturated or unsaturated, branched or unbranched, cyclic or openchain polyol such as castor oil, trimethylolpropane, trimethylolethane, pentaerythritol, sorbitol or glycerol, and alkoxylated glycerol or alkoxylated trimethylolpropan,
phenyl glycidyl ether, cresyl glycidyl ether, p-n-butylphenyl glycidyl ether, p-tert-butylphenyl glycidyl ether, nonylphenyl glycidyl ether, allyl glycidyl ether, butyl glycidyl ether, hexyl glycidyl ether, 2-ethylhexyl glycidyl ether, and glycidyl ethers of natural alcohols, for example C8- to C10-alkyl glycidyl ether or C12- to C14-alkyl glycidyl ether.

Highly preferred epoxy-containing compounds are selected from C12- to C14-alkyl glycidyl ether, neopentyl glycol diglycidyl ether and/or glycerine triglycidyl ether, especially neopentyl glycol diglycidyl ether.

According to a further preferred embodiment, the polyetheramine comprises or consists of a poly(propylene oxide) diamine and the epoxy-containing substance comprises or consists of a diglycidyl ether of an aliphatic diol, especially neopentyl glycol diglycidyl ether.

In the adduct, preferably, an amine group of the polyetheramine and an epoxide group of the epoxy-containing substance are connected in the form of an amino alcohol group, especially a β-amino alcohol group.

The adduct is in particular obtained by alkoxylation of the amine group of the polyetheramine with the epoxide group of the epoxy-containing substance.

Preferably, in the adduct a molar proportion of the polyetheramine to the epoxy-containing substance is (0.5-1.5):1, in particular (0.8-1.3):1, especially (0.9-1.1):1 or 1:1. In particular, the adduct comprises or consist of a 1:1 adduct of the polyetheramine and the epoxy-containing substance.

In particular, in the adduct, a molar proportion of the polyetheramine to the epoxy-containing substance is (1.5-2.5):1, in particular (1.8-2.3):1, especially (1.9-2.1):1 or 2:1, In the adduct, preferably, on average 1.5-2.5, in particular 1.8-2.3, especially 1.9-2.1 or 2, polyetheramines are interconnected per 1 molecule of the epoxy-containing substance.

According to another preferred embodiment, the adduct is a part of a composition comprising free or unreacted polyetheramine. Thereby, in particular, the polyetheramine is the same as the one incorporated in the adduct.

Thereby, in particular, a molar proportion of free or unreacted polyetheramine to the adduct is from 2:1-15:1, especially 3:1-10:1, in particular 4:1-9:1, for example 5:1-8:1.

The agent for reducing drying shrinkage and/or shrinkage cracking advantageously used in a quantity of 0.01-10 wt. %, for example 0.1-7 wt. %, especially 0.3-4 wt. %, for example 0.5-3 wt. %, particularly 0.6-1.7 wt. %, with respect to the total weight of the composition.

The agent for reducing drying shrinkage and/or shrinkage cracking can be used in combination with at least one additive, for example, a concrete additive and/or a mortar additive. The at least one additive comprises, for example, a defoaming agent, a dye, a preservative, a plasticizer, a retarding agent, an air pore forming agent, a shrinkage-reducing agent and/or a corrosion inhibitor or combinations thereof.

The at least one additive preferably contains a plasticizer. The latter contains, in particular a polycarboxylate, for example a polycarboxylate ether. Especially, the plasticizer is a comb polymer comprising a polycarboxylate backbone with polyether side chains bound to it. The side chains can be bound to the polycarboxylate backbone via ester, ether and/or amide groups.

Corresponding polycarboxylate ethers and manufacturing methods are disclosed, for example, in EP 1 138 697 B1 on page 7, line 20 to page 8, line 50, as well as in the examples thereof or in EP 1 061 089 B1, on page 4, line 54 to page 5, line 38 as well as in the examples thereof. As described in EP 1 348 729 on page 3 to page 5 as well as in the examples thereof, the comb polymer can be produced in the solid aggregate state. The disclosure of the above documents are incorporated by reference herein.

Such comb polymers are also marketed commercially by Sika Schweiz AG under the commercial name series ViscoCrete®.

If present, the plasticizer can constitute a proportion of 0.01-6 wt %, for example, 0.1-4 wt %, for example, 0.5-3 wt %, with respect to the mineral binder. Owing to the combination with the plasticizer, the processability of the binder composition can be improved and at the same time higher compressive strengths are achieved. As has been shown, the plasticizers have hardly any negative influence or no negative influence at all on the effect of agent for reducing drying shrinkage and/or drying cracking.

The agent for reducing drying shrinkage and/or drying cracking can be added before or during the mixing to the mineral binder.

For example, the agent for reducing drying shrinkage and/or drying cracking can be admixed to the mixing water and added with the latter to the mineral binder during the mixing. It is also possible to mix the agent for reducing drying shrinkage and/or drying cracking directly with the mineral binder before adding the mixing water, and to add the mixing water only subsequently. The addition of the mixing water can here also occur with a time delay, for example, hours, days, or even months later.

In a special embodiment, the agent for reducing drying shrinkage and/or drying cracking can also be sprayed onto a powdery mineral binder and/or onto the composition in powdery from.

A further aspect of the present invention is related to a method for producing an agent for reducing drying shrinkage and/or drying shrinkage cracking in mineral binder compositions whereby the method comprises the step of forming an adduct by reacting a polyetheramine and an epoxy-containing substance.

Preferably, in the method an amine group of the polyetheramine is alkoxylated with an epoxide group of the epoxy-containing substance.

Especially, a molar proportion of the polyetheramine to the epoxy-containing substance is from 2:1 to 15:1, especially, 5:1-12:1, in particular 7:1-9:1.

In the method, the polyetheramine preferably is reacted with the epoxy-containing substance at a temperature of 25-95° C., especially 40-75° C., in particular 50-70° C., for example 55-65° C.

Preferably, the reaction is carried out in the absence of a solvent, especially in the absence of a solvent which is reactive towards epoxy groups.

A further aspect of the present invention is related to an agent for reducing drying shrinkage and/or drying cracking in mineral binder compositions comprising an adduct of a polyetheramine and an epoxy epoxy-containing substance as described above or comprising an agent which is obtainable or obtained by a method as described above.

Preferably, the agent for reducing drying shrinkage and/or drying cracking in mineral binder compositions additionally comprises free or unreacted polyetheramine. Thereby, in particular, the polyetheramine is the same as the one incorporated in the adduct.

In particular, a molar proportion of free or unreacted polyetheramine to the adduct is from 2:1-15:1, especially 3:1-10:1, in particular 4:1-9:1, for example 5:1-8:1.

Another aspect of the present invention is concerned with a composition, in particular a mortar, concrete or grout composition, comprising a mineral binder and an agent for reducing drying shrinkage and/or drying cracking in mineral binder compositions as described above.

The mineral binder can be, for example, in a dry form or in the form of a binder composition, which has been made fluid with mixing water or stiffened.

Especially, the mineral binder composition is defined as described above.

The agent for reducing drying shrinkage and/or drying cracking advantageously is present in the composition in a quantity of 0.01-10 wt. %, for example 0.1-7 wt. %, especially 0.5-4 wt. %, for example 1-3 wt. %, with respect to the total weight of the composition.

In addition, an additive as described above is advantageously present. The additive can comprise a plasticizer, for example, a polycarboxylate ether. If present, the plasticizer can include a proportion of 0.01-6 wt %, for example, 0.1-4 wt %, for example, 0.5-3 wt %, relative to the mineral binder.

In an additional exemplary embodiment, the composition contains additional solid aggregates, for example, gravel, sand and/or rock material. Corresponding compositions can be used, for example, as mortar mixtures, concrete mixtures or grout mixtures.

For example, the composition in addition contains water, wherein a weight ratio of water to mineral binder can be in the range of 0.25-0.8, for example, 0.3-0.6, for example, 0.35-0.5. Such binder compositions can be processed directly as mortar mixtures, concrete mixtures or grout mixtures.

Especially, the mineral binder composition is a mortar, concrete or grout composition comprising a mineral binder, aggregates and water. With respect to the solid content at the time of mixing, the mineral binder composition comprises for example 5-25 wt. %, in particular 10-20 wt. %, of mineral binder, especially cement, and 75-95 wt. %, in particular 80-90 wt. %, aggregates, especially sand, gravel and/or rock material.

An additional aspect of the present invention relates to a molded body which can be obtained by curing a mineral binder composition as described above after the addition of water. The molded body so produced can here be of almost any shape, and it can be, for example, a component of a structure, such as, for example, a building, masonry or a bridge.

Further advantageous embodiments and combinations of features of the invention will emerge from the following exemplary embodiments and the totality of the patent claims.

Exemplary Embodiments

1. Preparation of Adducts of Polyetheramines and an Epoxy-Containing Compounds

Several adducts P1, P2, P3 and P4 of epoxy-containing compounds with polyetheramines have been prepared. Specifically, for producing adduct P1, in a first step, 11.1 g of neopentyl glycol diglycidyl ether and 88.9 g Jeffamine D-230 (purchased from Huntsman) have been mixed at room temperature for 5 minutes. Then, while stirring the reaction mixture, the mixture was heated to a temperature of 60° C. within 10 minutes. Thereafter, the reaction temperature spontaneously increased to 75° C. for about 10 minutes and then decreased to 60° C. Stirring was continued for another 90 minutes. Then the heating was turned off so that the reaction mixture could cool down to room temperature. Thereafter, the reaction mixture was diluted with water (30 wt. % of water with respect to the total weight of the reaction mixture). The so obtained adduct was referred to P1.

Adducts P2, P3 and P4 have been produced similarly with the components and proportions given in table 1. R1, which is a shrinkage reducing agent known from prior art (not according to the invention), has been provided for comparison.

TABLE 1

Overview of adducts P1 □ P4.

| Component ($M_w$) | R1 | P1 | P2 | P3 | P4 |
|---|---|---|---|---|---|
| Neopentyl glycol diglycidyl ether* (216 g/mol) | — | 11.1 g | — | 4.8 g | 2.0 g |
| Glycerine triglycidyl ether* (260 g/mol) | — | — | 9.1 g | — | — |
| Jeffamine D-230# (230 g/mol) | — | 88.9 g | 90.9 g | — | — |
| Jeffamine D-400# (400 g/mol) | — | — | — | 95.2 g | — |
| Jeffamine D-4000# (4000 g/mol) | — | — | — | — | 98.0 g |
| Neopentyl glycol | 100 g | — | — | — | — |
| Molar ratio of polyetheramine to epoxy-containing compound | — | 7.5 | 11.3 | 10.0 | 2.7 |

*= epoxy-containing compound
= polyetheramine (poly(propylene oxide) diamine, terminated with primary amine groups)

All of the adducts P1-P4 as well as reference substance R1 were provided in the form of an aqueous solution with a water content of 30 wt. % with respect to the total weight of the composition.

2. Mineral Binder Tests
2.1 Concrete Compositions

The adducts were tested in concrete mixtures. For this, a concrete was used with the dry composition as specified in table 2.

TABLE 2

Dry concrete mixtures

| Component | Quantity |
|---|---|
| Cement | 420 g |
| Sand | 333 g |
| Aggregates (<13 mm) | 1'330 g |

The cement used was a Portland cement (OPC type I). The sands, the aggregates and the cement were mixed dry for 1 minute in a Hobart mixer. The mixing water, in which one of the adducts as well as a superplasticizer (Sika Visco-Crete® SR-41; an aqueous solution of a polycarboxylate ether with a solid content of ca. 45 wt. %) was dissolved or dispersed was added in the course of 30 seconds and mixing was done for another 4.5 minutes. The total wet mixing time was 5 minutes. The amount of water was chosen to obtain a ratio of water to cement (w/c) of 0.46.

The adducts were added with a fraction of 1.5 wt.-% and a proportion of the superplasticizer was 0.5 wt. %, in each case with respect to the total weight of the concrete composition.

2.2 Mortar Composition

Further tests have been performed with a standard self-levelling high strength mortar instead of the concrete mixtures as described above. Thereby, the adducts were added with the mixing water in various concentrations, as indicated in table 4 (cf. results section, chapter 2.4).

2.3 Test Methods

To determine the effectiveness of the adducts, the time-to-cracking of the concrete as described in chapter 2.1 above was measured according to standard ASTM C 1581-04 596-09 and the shrinkage (displacement) was measured according to standard ASTM C596-09 (2017). Curing of the concrete specimens was done at 21° C. and at 50% humidity.

Also, the slump flow of the concrete mixtures was measured in line with BS EN 12350-2 immediately after adding the water.

Furthermore, the compressive strength of the concrete mixtures was determined 1 day and 3 days after adding water to the concrete mixtures. The testing to determine the compressive strength (in MPa) was done by standard BS EN 12390-1 to 12390-4.

2.4 Results

Table 3 gives a summary of the results obtained with the concrete compositions as described in chapter 2.1. Please note that test R0 without adduct and the test with substance R1 (not according to the invention) have been done for comparison.

TABLE 3

Overview of results in concrete compositions

| | Adduct | | | |
|---|---|---|---|---|
| Mineral binder properties | R0 | R1 | P1 | P2 |
| Slump flow [cm] | 35 | 34 | 33 | 30 |
| Compressive strength [MPa] | | | | |

TABLE 3-continued

Overview of results in concrete compositions

| Mineral binder properties | Adduct | | | |
|---|---|---|---|---|
| | R0 | R1 | P1 | P2 |
| after 1 day | 218 | 141 | 165 | 166 |
| after 3 days | 375 | 282 | 291 | 285 |
| Time to cracking [days] | 8.4 | 14.3 | 15.2 | 16.6 |
| Shrinkage | | | | |
| after 1 day | −0.006% | −0.000% | −0.000% | −0.002% |
| after 3 days | −0.042% | −0.020% | −0.025% | −0.027% |
| after 5 days | −0.060% | −0.035% | −0.040% | −0.045% |

It is evident from table 3 that adducts P1 and P2, both according to the invention, are highly beneficial in terms of reducing drying shrinkage as well as reducing drying shrinkage cracking. Also, compared to the prior art shrinkage reducing agent tested (R1), early strength development after 1 and 3 days clearly is less affected by the inventive agents P1 and P2. At the same time, workability (slump flow) can be maintained at a high level.

Table 4 shows the results obtained when using the inventive adducts in various concentrations, in mortar compositions as described in chapter 2.2.

TABLE 4

Overview of results in high strength mortar compositions

| | Adduct | | | | | |
|---|---|---|---|---|---|---|
| | R0 | P1 | | | | |
| | Concentration [wt. %] | | | | | |
| Shrinkage [%] | — | 0.1 | 0.2 | 0.3 | 0.5 | 0.7 |
| after 2 hours | −0.0265 | −0.0303 | −0.0243 | −0.0059 | −0.0026 | −0.0102 |
| after 5 hours | −0.2055 | −0.1585 | −0.1564 | −0.0580 | −0.0508 | −0.0579 |
| after 10 hours | −0.2805 | −0.1988 | −0.1943 | −0.0965 | −0.0953 | −0.0839 |
| after 24 hours | −0.2925 | −0.2063 | −0.2039 | −0.0961 | −0.0949 | −0.0837 |
| after 48 hours | −0.3141 | −0.2251 | −0.2193 | −0.1034 | −0.1071 | −0.0934 |

It is evident from table 4, adduct P1 according to the invention is highly beneficial in terms of reducing drying shrinkage, especially at early times, i.e. from 5 to 48 hours after mixing the mortar composition.

It will be appreciated by those skilled in the art that the present invention can be embodied in other specific forms without departing from the spirit or essential characteristics thereof. The presently disclosed embodiments are therefore considered in all respects to be illustrative and not restricting.

For example, instead of or alternatively to the addition of the adducts with the mixing water as described in chapter 2.2 above, the adducts can be also added to the mortar or concrete before adding the mixing water, e.g. by spraying the adduct to sands during mortar preparation.

Also the adducts can be prepared without any water in the solid state. In this case, the adducts can e.g. be added directly to the mortar in the form of a dry powder.

The invention claimed is:
1. A method comprising:
obtaining an agent that comprises an adduct of a polyetheramine and an epoxy-containing compound for reducing drying shrinkage and/or for reducing drying cracking in a mineral binder composition;
adding the agent to a composition comprising the mineral binder composition; and
drying and/or hardening the mineral binder composition, wherein the agent is added in the composition in an amount of from 0.01 to 10 weight % of the composition such that an amount of the agent is present in the composition following drying and/or hardening of the mineral binder composition to reduce drying shrinkage and/or drying cracking of the mineral binder composition in comparison to a same composition containing none of the agent.

2. A composition, comprising a mineral binder composition and an agent for reducing drying shrinkage and/or for reducing drying cracking in the mineral binder composition, wherein the agent is obtained by forming an adduct by reacting a polyetheramine and an epoxy-containing substance, wherein an amine group of the polyetheramine is alkoxylated with an epoxide group of the epoxy-containing substance, and
wherein the agent is present in the composition in an amount of from 0.01 to 10 weight % of the composition such that an amount of the agent is present in the composition following drying and/or hardening of the mineral binder composition to reduce drying shrinkage and/or drying cracking of the mineral binder composition in comparison to a same composition containing none of the agent.

3. The composition according to claim 2, wherein the mineral binder composition comprises mineral binder, aggregates and water.

4. The composition according to claim 3, wherein the aggregates comprise one or more of sand, gravel or rock material.

5. The composition according to claim 3, wherein the mineral binder is a binder that reacts in the presence of water in a hydration reaction to form solid hydrates or hydrate phases.

6. The composition according to claim 3, wherein the mineral binder is selected from the group consisting of a hydraulic binder, a latent hydraulic binder, a puzzolanic binder, a nonhydraulic binder and a cementitious binder.

7. The composition according to claim 2, wherein the polyetheramine comprises an amine terminated poly(alkylene oxide).

8. The composition according to claim 2, wherein a molecular weight Mw of the polyetheramine is from 100-10,000 g/mol.

9. The composition according to claim 2, wherein the epoxy-containing substance comprises a glycidyl ether.

10. The composition according to claim 2, wherein the epoxy-containing substance comprises a diglycidyl ether and/or a triglycidyl ether.

11. The composition according to claim 2, wherein a molecular weight of the epoxy-containing compound is from 50-2,000 g/mol.

12. The composition according to claim 2, wherein the polyetheramine comprises a poly(propylene oxide) diamine and the epoxy-containing substance comprises a diglycidyl ether of an aliphatic diol.

13. The composition according to claim 2, wherein in the adduct, an amine group of the polyetheramine and an epoxide group of the epoxy-containing substance are connected in the form of an amino alcohol group.

14. The composition according to claim 2, wherein in the adduct, a molar proportion of the polyetheramine to the epoxy-containing substance is in the range of from 1.5:1-2.5:1.

15. The composition according to claim 2, wherein the agent comprises the adduct together with free or unreacted polyetheramine.

\* \* \* \* \*